United States Patent [19]
Conrads et al.

[11] Patent Number: 5,153,423
[45] Date of Patent: Oct. 6, 1992

[54] CIRCUIT ARRANGEMENT FOR READING OUT SENSORS SENSITIVE TO LIGHT OR X-RAYS

[75] Inventors: Norbert Conrads, Hauset, Belgium; Ulrich Schiebel; Herfried Wieczorek, both of Aachen, Fed. Rep. of Germany

[73] Assignee: U.S. Philips Corporation, New York, N.Y.

[21] Appl. No.: 621,110

[22] Filed: Nov. 30, 1990

[30] Foreign Application Priority Data

Dec. 5, 1989 [DE] Fed. Rep. of Germany ....... 3940164

[51] Int. Cl.⁵ ............................................. H01J 40/14
[52] U.S. Cl. ............................ 250/208.1; 358/213.31
[58] Field of Search ............... 250/208.1, 338.1, 338.2; 358/213.27, 213.31

[56] References Cited

U.S. PATENT DOCUMENTS 4,797,560 1/1989 Berger et al. ..................... 250/578
4,800,557 1/1989 Weber ................................ 370/3
4,945,419 7/1990 Arques .......................... 358/213.31
4,948,966 8/1990 Arques et al. .................. 250/208.1

FOREIGN PATENT DOCUMENTS 3431448 4/1986 Fed. Rep. of Germany .
3531448 6/1988 Fed. Rep. of Germany .

Primary Examiner—David C. Nelms

[57] ABSTRACT

A photodiode radiation sensor sensitive to luminous or x-ray radiation, has an inherent capacitance which is charged by the radiation. The charge is read out by a switching diode. The diode is placed in its conductive state by an auxiliary voltage and is switched off after the read-out process. The quantity of charge flowing during the read-out process is measured and used to determine the quantity of incident radiation. To measure relatively small quantities of charge, a voltage is coupled in when the auxiliary voltage is switched on to place the switching diode in a more strongly conducting state so that during the read-out process a larger quantity of charge flows away.

22 Claims, 1 Drawing Sheet

//CIRCUIT ARRANGEMENT FOR READING OUT SENSORS SENSITIVE TO LIGHT OR X-RAYS

BACKGROUND OF THE INVENTION

The invention relates to a circuit arrangement for reading out a sensor sensitive to light or X-rays comprising a radiation-sensitive element, more particularly a photodiode, whose charge can be read out by means of a switching diode, which for this purpose is put in its conductive state by means of a voltage temporarily applied to it.

In such circuit arrangements for reading out sensors sensitive to light or X-rays, there is the problem that, after the voltage has been switched on, the switching diode becomes not sufficiently conducting especially if the capacitance of the photodiode was charged by the sensor element to an only comparatively small extent. A realizable read-out of the charge stored in the capacitance of the photodiode is therefore possible only with comparatively large quantities of charge. Especially for the field of use of X-ray imaging, however, the quantities of charge are comparatively small so that, for example, in this field of use such a circuit arrangement cannot be employed.

Further, it is known, for example, from DE-OS 3531448 which corresponds to U.S. Pat. No. 4,800,557 to use for reading out such radiation-sensitive sensors instead of a switching diode field effect transistors in thin-film technology. However, such field effect transistors produce on account of parasitic capacitances a disturbing offset during reading out. Further, driving the gate of each field effect transistor requires a further lead so that the yield in production is reduced.

SUMMARY OF THE INVENTION

The invention has for its object to provide a circuit which with the simplest possible circuitry permits reading out even small quantities of charge stored in the sensor element capacitance.

According to the invention, this object is achieved in that when a signal is additionally coupled in and, when a potential shift is switched on, the switching diode is placed in a more strongly conductive state than would be the case without the additional signal so that during reading out a larger quantity charge flows away. This signal additionally coupled in also permits of reading out comparatively small quantities of charge stored in the sensor element capacitance without additional elements being required for the reading out operation. Due to the signal additionally coupled in, during reading out, a larger quantity of charge will flow away than would be the case without the signal coupled in. Therefore, when measuring the quantity of charge flowing during the reading out operation, it should be taken into account that a part of the quantity of charge is due to the signal additionally coupled in. By calculation, this quantity of charge can then be subtracted from the quantity of charge measured overall. In the result, that quantity of charge then remains which is due to the charge of the capacitance by the sensor element.

A further advantage of this circuit arrangement is that the sensor element, which may comprise a photodiode and the switching diode can be manufactured in the same processing steps.

According to an embodiment of the invention, the signal additionally coupled in is a constant direct current, which flows in the reverse direction of the sensor element photodiode. Such a direct current results in that the switching diode in its characteristic curve is placed more strongly in its conductive state before the beginning of the read out operation. After the voltage has been switched on, the switching diode is more strongly conducting with small quantities of charge stored in the capacitance so that small quantities of charge can be read out from the capacitance. With the quantity of charge read out, it should again be taken into account that due to the direct current the capacitance was additionally charged so that this charge value is to be subtracted for determining that charge value which is due to the sensor element.

According to a further embodiment, the signal additionally coupled in is produced by means of a constant additional irradiation of the sensor element. In this case, by means of the sensor element a quantity of charge due to the additional irradiation is therefore produced. In addition, a quantity of charge is produced which is due to the light or X-ray radiation being measured. During the reading-out of the quantity of charge from the sensor element capacitance, that quantity of charge is to be subtracted which is due to the additional irradiation.

According to a further embodiment of the invention, between two read-out cycles of the first switching diode a further voltage is coupled in and then switched off, which in relation to the voltage provided for the read-out process of the first switching diode has the inverse polarity and puts a second switching diode (8), which is connected parallel to and in the opposite sense across the first switching diode, temporarily in its conductive state.

In order that, when switching on the voltage, the switching diode is put in a more strongly conducting state than would be the case without a signal additionally coupled in, it is advantageous to provide a further switching diode, which is connected in the opposite sense across to the first switching diode. Between two read-out processes of the first switching diode, the second switching diode is then put temporarily in its conductive state by means of a further voltage. After this voltage has been switched off, in the characteristic curve of the first switching diode, which is permanently used to read out the charge of the capacitance, a state has already been reached in which it is sufficient to switch on the voltage assigned to this diode to ensure that this diode is reliably passed to its conductive state even with small quantities of charge stored in the capacitance. The second switching diode and the voltage applied thereto therefore serve to put the first diode, when it is switched on, to a more strongly conducting state than would be the case without the second switching diode and the potential shift applied thereto. At any rate, it holds that, before one of the voltages is coupled in, the other voltage must be switched off beforehand.

Also in this case, it should be taken into account that the two voltages result in an additional quantity of charge at the sensor element capacitance, which is not due to the exposure of the sensor element. According to a further embodiment of the invention, for determining the quantity of charge produced by the sensor element, the voltages of different polarities have the same value and for determining each measurement value of the quantity of radiation, the quantities of charge flowing away through the first and second switching diodes after application of the respective voltage are integrated.

Therefore, those quantities of charge are integrated which flow after the instant of switching on the first voltage (and switching off this voltage) until the instant of switching on the second voltage and after the instant of switching on the second voltage (and switching off this voltage) until the instant of switching on the first voltage. The quantities of charge flowing at these stages are approximately equal and have little noise. The quantities of charge due to the voltage shifts cancel each other by the integration and the measuring signal is that quantity of charge which remains due to the luminous or X-ray radiation to be measured. Therefore, no constant value need be subtracted from the measuring signal thus produced.

According to a further embodiment of the invention, for determining each measurement value of the quantity of radiation, only one voltage is accurately coupled in and then switched off. Only the quantity of charge flowing away through the switching diode that is put in its conductive state due to this voltage is measured. For determining the next measurement value, a voltage of inverse polarity is coupled in and then switched off. In this variation, the charges flowing away after application of one of the voltages are, therefore, individually measured so that for each measurement value only one voltage is to be coupled in temporarily. The quantity of charge flowing away after that voltage has been switched on which puts the second switching diode in its conductive state is then used to determine the quantity of radiation and hence the charge produced by it in the sensor element capacitance. However, it should then be taken into account that in this case the quantity of charge flowing away through the second switching diode is reduced by a quantity of charge applied to the capacitance by means of the sensor element. This therefore means that the quantity of charge read out at this stage is smaller as the quantity of charge produced by exposure is larger. The advantage of this variation is that between two read-out processes no additional reset process is required. Each voltage shifts or the currents flowing subsequently are rather used directly for measuring the desired signal.

Normally, the capacitance of the photodiode sensor is sufficient. If this should not be so in special cases, according to a further embodiment of the invention, an additional capacitance is connected parallel to the photodiode.

BRIEF DESCRIPTION OF THE DRAWING

A few embodiments of the invention will now be described more fully with reference to the drawing. In the drawing.

DESCRIPTION OF THE PREFERRED EMBODIMENTS

Figure 1:
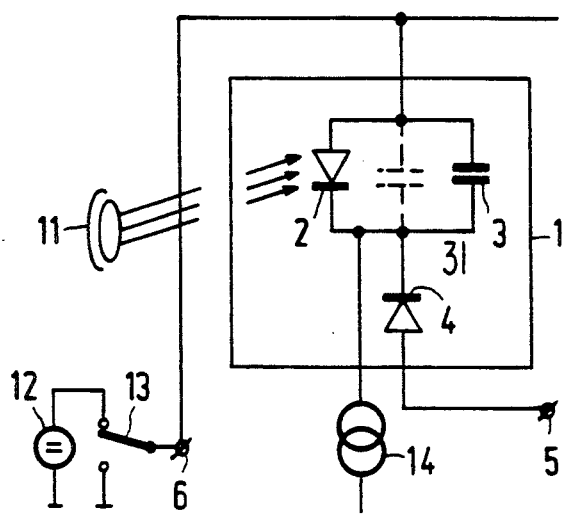
FIG. 1 shows a first embodiment of a sensor sensitive to luminous or X-ray radiation comprising a readout device having a switching diode.

In FIG. 1, a sensor 1 sensitive to luminous or X-ray radiation is shown, which comprises a sensor element, preferably a photodiode 2, sensitive to radiation. The photodiode 2 has an inherent capacitance, which for the sake of clarity is shown in FIG. 1 as a separate capacitance 3. A switching diode 4 is connected by its cathode to the cathode of the photodiode 2 and to the capacitance 3, the term "cathode" relating to the forward direction. A switching lead having an external connection 5 leads to the anode of the switching diode 4. The connection of the photodiode 2 anode and of the capacitance 3 on the anode side is connected to a signal lead, which has a connection 6. In the alternative an additional capacitance 3' shown in phantom may be coupled across photodiode 2.

Figure 2:
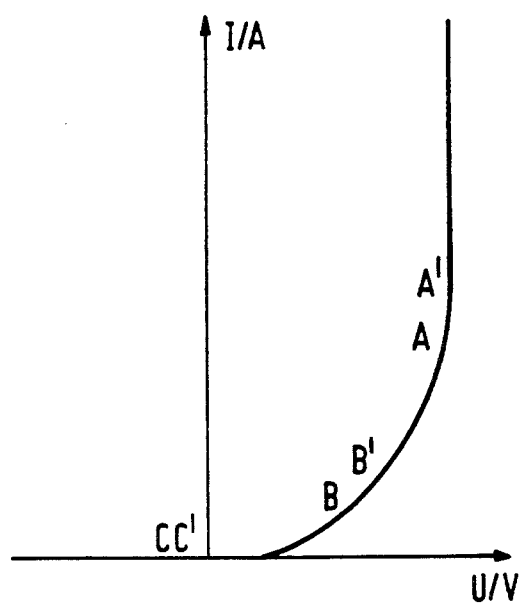
FIG. 2 shows a characteristic curve of the read-out device shown in FIG. 1.

As indicated in the introductory portion, a problem with prior art circuits of the type disclosed is that the switching diode 4, without the present invention, does not become sufficiently conducting if the capacitance 3 of the photodiode is charged to only a small extent as occurs in X-ray imaging. A realizable read-out of the charge stored in capacitance 3 is possible only with comparatively larger quantities of charge. In FIG. 2, the characteristic curve of diode 4 is shown. In the figure, U/V means units of voltage and I/A means current in amperes. By way of example, a non-stored charge (no radiation) in the presence of voltage 12 causes the current in diode 4 to reach point B. A stored charge due to X-ray radiation causes this current to reach point B'. Neither of the points B or B' represents sufficient energy to cause diode 4 to become fully conductive. To read the value of the charge at points B or B' requires the diode 4 to be fully conductive.

To this end, additional radiation from source 11 permits the curve of FIG. 2 to reach point A in the absence of X-ray radiation or to point A' in response to X-ray radiation. Points A and A' are reached because diode 4 is more fully conductive due to the greater charge in capacitance 3. This portion of the curve is more linear as shown, permitting a more accurate measurement of the difference between points A and A' as compared to the more non-linear differences between points B and B' as would occur without radiation from source 11.

The operation of the sensor 1 shown in FIG. 1 is explained below by means of a characteristic curve FIG. 2 of the switching diode 4.

In order that the charge stored in the capacitance 3 can be read out, the voltage across the switching diode 4 is varied in that either through the signal lead connection 6 or through the read-out lead connection 5 a potential jump or shift, i.e. an additional or varied voltage, is coupled in. For this purpose, in FIG. 1 a direct current voltage source 12 and a switch 13 apply the direct current voltage in a desired manner. When the direct current voltage source 12 is connected by switch 13 to the connection 6, the diode 4 is switched to its conductive state at point A in response to the additional light from source 11. With the diode 4 conducting, during reading out of the charge on capacitor 3 at connection 5, the voltage across the diode 4 will gradually decrease due to the charge flowing so that this decreasing voltage gradually cuts off the current. Now the point B in the characteristic curve is reached. In order to terminate the read-out process, the applied DC voltage from source 12 coupled in is switched off. The diode 4 now becomes non-conducting; in the characteristic curve the point C is now reached. Due to X-ray radiation incident upon the sensor element photodiode 2, the element 2 produces a current which again results in charging capacitance 3. In the characteristic curve shown in FIG. 2, the point C' is now reached. For reading out this charge, the DC voltage is switched on again so that the point B' in the characteristic curve is reached. However, a range of the characteristic curve is involved in which the switching diode 4 hardly becomes conducting so that the comparatively small charge of the capacitance 3 cannot reliably be read out. After the voltage has been switched off, the point C is reached again.

It becomes clear that the read-out process, which starts with stored charge at point B' and with non-stored charge at point B, is effected in that range of the characteristic curve is in use in which the switching diode 4 does not become sufficiently conducting. In order that small charges can also be reliably read out, the sensor element 2 is irradiated by means of an additional exposure. For this purpose, in FIG. 1 an additional light source 11 is shown diagrammatically. In this case, after the voltage has been switched on, not the point B or the point B', but the point A or the point A' would be reached according to whether element 2 is irradiated with X-ray radiation. A read-out process can then take place during which in the characteristic curve, starting from the point A or the point A', the point B is reached. When the DC voltage from source 12 is switched off, this again results in reaching point C. The subsequently considerably larger quantity of charge applied to the capacitance 3 by source 11 leads, after the voltage has been switched on, to reaching point A so that again a more accurate read-out process is possible. The difference between the primed and uprimed letters of FIG. 2 represents the value of the charge being measured.

With respect to the quantity of charge flowing away during the read-out process, however, it should be taken into account that a large part of the quantity of charge is due to the additional irradiation by the additional light source 11. Therefore, this quantity of charge is to be subtracted from the measured quantity so that in the end result, the quantity of charge applied by the sensor element photodiode 2 to the capacitance 3 remains.

A further possibility according to the invention is that in a manner not shown in FIG. 2 a constant direct current is coupled into the signal lead connection 6 or the read-out lead connection 5, which direct current flows in the reverse direction of the photodiode 2. However, this direct current may also be fed directly into the photodiode 2 and the capacitance 3, as is indicated in FIG. 1 by a current source 14. In this case, the read-out process starts at a point of the characteristic curve in which the switching diode is certainly conducting; for example, point A of the characteristic curve may be involved. With respect to the evaluation of the quantity of charge flowing away during the read-out process, the same holds as in the case of the additional irradiation of the sensor element.

Figure 3:
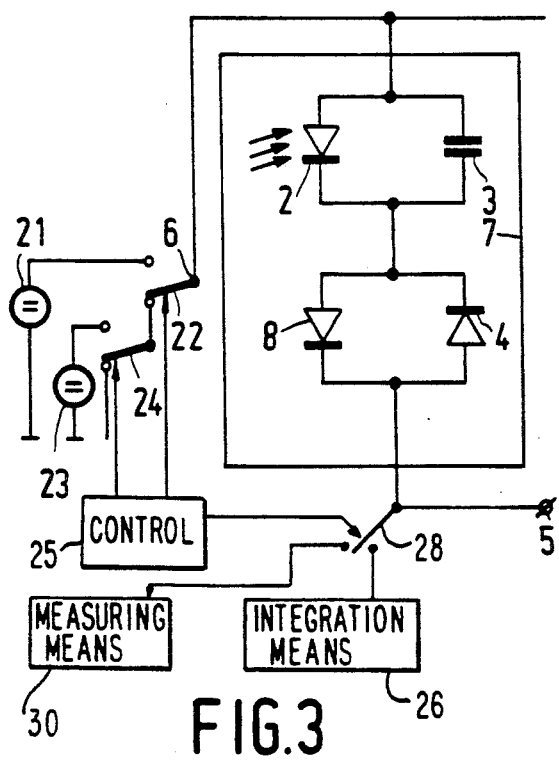
FIG. 3 shows a second embodiment of a sensor comprising a read-out device having two switching diodes arranged in parallel opposition.

An arrangement shown in FIG. 3 comprises a sensor 7 sensitive to luminous or X-ray radiation, which is constructed with respect to the sensor photodiode 2, the capacitance 3, the switching diode 4, the read-out lead connection 5 and the signal lead connection 6 in the same manner as the sensor shown in FIG. 1. The sensor 7 has an additional switching diode 8, however, which is connected in the opposite sense across the switching diode 4. By means of a switch 22, either a direct current voltage source 21 or a further switch 24 both switches being operated by control 25, may be connected to the signal lead connection 6, which switch can be changed over between a further direct current voltage source 23, which has a polarity inverse to the direct current voltage source 21, and earth (reference potential). By a suitable change-over of the switches 22 and 24, a direct current voltage of desired polarity can be temporarily coupled into the signal lead connection 6.

The switching diode 8 may be used to pass the switching diode 4, by switching on a voltage applied to the switching diode 4, to a more strongly conducting state. A further possibility is that a voltage applied to the switching diode 8 is used to carry out through the switching diode 8 a read-out process, in which the quantity of charge flowing away is separately evaluated. These two possible modes of operation of the circuit shown in FIG. 3 are explained more fully hereinafter with reference to the characteristic curve shown in FIG. 4, which represents a characteristic curve common to the two switching diodes 4 and 8.

First the first possibility of use of the circuit shown in FIG. 3 will now be described, in which the switching diode 8 solely serves to initiate the read-out process effected through the switching diode 4 in a most favourable range of the characteristic curve of the switching diode 4.

Figure 4:
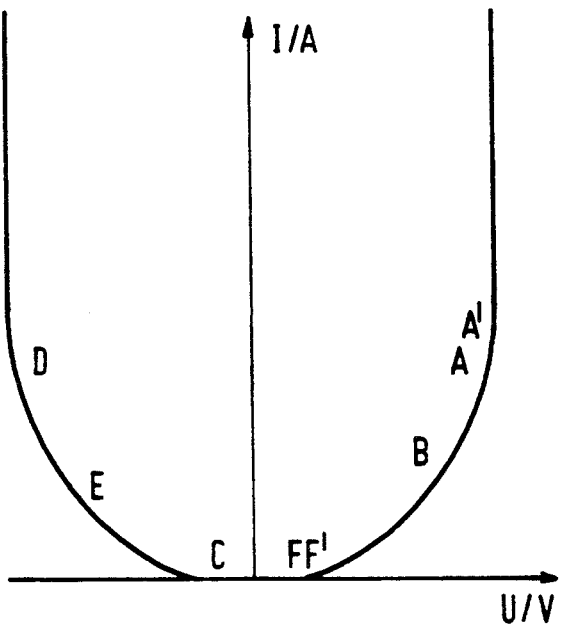
FIG. 4 shows a characteristic curve of the read-out device shown in FIG. 3.

The following description of such a process and its preparation, respectively, will be explained more fully with reference to the points A to F present in the characteristic curve shown in FIG. 4. The primed points are reached in those cases in which, by means of the sensor element photodiode 2, a charge is applied to the capacitance 3.

In the procedure described below, a closed process is concerned. The description is begun at point F. Upon application of a charge to the capacitance 3, the point F' is reached. Now by means of the switch 22 and the direct current voltage source 21 a voltage is switched on, which passes the switching diode 4 to its conductive state. When the point A or A' is reached, upon application of charge to the capacitance 3, the switching diode 4 becomes conducting discharging the capacitance 3. Now point B in the characteristic curve is reached. The voltage assigned to the switching diode 4 is now switched off so that in the characteristic curve point C is reached. By means of the switches 22 and 24 operated by control 25 and the direct current voltage source 23, a further voltage, which passes the switching diode 8 to its conductive state and which has with respect to the voltage assigned to the switching diode 4 the same value, but the inverse polarity, is now switched on. Thus, in the characteristic curve point D is reached. The switching diode 8 is now conducting so that charge flows away and in the characteristic curve point E is reached. After the voltage assigned to the switching diode 8 has been switched off, in the characteristic curve point F is reached again.

For measuring the charge applied to the capacitance 3, it is advantageous to measure not only that quantity of charge which flows away during the conductive state of the switching diode 4, but rather also the quantity of charge which flows away during the conductive state of the switching diode 8. When in fact these two quantities of charge are integrated by integration means 26 via switch 28 under control of control 25, a constant value need no longer be subtracted from the measuring signal to be obtained; rather the desired measuring signal is directly measurable by measuring means 30, which indicates the quantity of charge applied by means of the photodiode 2 to the capacitance 3.

In this variation of use of the arrangement shown in FIG. 3, the situation is therefore such that for each desired measurement value the cycle described above is passed through once with the two voltages of opposite polarities. The signals then obtained are integrated by means 26 and directly represent the desired measuring signal.

In a second variation of use of the arrangement shown in FIG. 3, however, there is also the possibility of individually evaluating the quantities of charge flowing away through the switching diode 4 and through the switching diode 8, respectively. For each desired measuring signal only one voltage is then coupled in by control 25 and switches 22 and 24 and the quantity of charge then flowing away is measured by means 30 via switch 28 and control 25. Subsequently, this voltage is switched off again by control 25. For the next measuring signal, a voltage of opposite polarity is then produced via control 25, the quantity of charge then flowing away is measured again and thereafter the voltage is switched off again via control 25, and so on. In this case, an integration is no longer possible. The additional signal superimposed on the actual measuring signal and produced each time by the voltages of different polarities must rather be corrected by calculation. In this variation, the means required for calculation become more complicated. However, in comparison with the first variation of use, the advantage is obtained that for each measurement value only one voltage need be temporarily coupled in.

We claim:

1. A device for sensing the magnitude of incident electromagnetic radiation and for storing the sensed radiation as a charge for subsequent read-out of said radiation magnitude, said device comprising:
   a photodiode for receiving said incident radiation and creating a charge from said incident radiation, said photodiode having an inherent capacitance for storing said charge;
   a read-out terminal;
   a first switching diode coupled between the terminal and said photodiode for discharging said capacitance for read-out at said terminal when the switching diode is in a first conductive state;
   means for selectively applying a voltage to said switching diode to selectively place said switching diode in said first conductive state; and
   means for applying a signal, which when the voltage is applied, places the switching diode in a more highly conductive second state than said first state so that during read-out a larger charge flows from said capacitor than otherwise would flow without said applied signal.

2. The device of claim 1 wherein said means for applying said signal includes means for providing a constant direct current in a sense to reverse bias said photodiode.

3. The device of claim 1 wherein said means for applying said signal includes means for irradiating said photodiode with radiation of constant magnitude in addition to said incident radiation.

4. The device of claim 1 wherein said charge is read out in successive cycles, said device including a second switching diode connected across said first diode in opposite sense to the first diode, said means for selectively applying a voltage including means for selectively applying a first voltage in a first read-out cycle to make only the first diode conductive and for selectively coupling a second voltage between two successive read-out cycles to selectively make only the second diode conductive, the second voltage having an inverse polarity of that of the first voltage.

5. The device as claimed in claim 4 wherein the voltage of different polarities have the same magnitude value and further including integration means for determining for each measurement value of the quantity of radiation the quantities of charge flowing away through the first switching diode and through the second switching diode after application of the respective voltages.

6. The device of claim 1 wherein the photodiode is sensitive to X-ray radiation.

7. The device of claim 1 including an additional capacitance connected parallel to the photodiode.

8. The device of claim 4 wherein said means for applying a temporary voltage includes means for coupling one of said voltages at a time to said switching diodes and for switching that voltage off prior to the coupling in of the other voltage to selectively make each said switching diodes conductive in a different interval to discharge said capacitance, and measuring means for selectively measuring the charge discharged from said capacitance in each said interval for determining the value of the quantity of sensed radiation represented by said charge for each interval.

9. The device of claim 8 wherein the photodiode is sensitive to X-ray radiation.

10. The device of claim 2 wherein the photodiode is sensitive to X-ray radiation.

11. The device of claim 3 wherein the photodiode is sensitive to X-ray radiation.

12. The device of claim 4 wherein the photodiode is sensitive to X-ray radiation.

13. The device of claim 6 including an additional capacitance connected parallel to the photodiode.

14. The device of claim 11 including an additional capacitance connected parallel to the photodiode.

15. The device of claim 10 including an additional capacitance connected parallel to the photodiode.

16. The device of claim 8 including an additional capacitance connected parallel to the photodiode.

17. The device of claim 9 including an additional capacitance connected parallel to the photodiode.

18. The device of claim 2 including an additional capacitance conencted parallel to the photodiode.

19. The device of claim 3 including an additional capacitance connected parallel to the photodiode.

20. The device of claim 4 including an additional capacitance connected parallel to the photodiode.

21. The device of claim 5 including an additional capacitance connected parallel to the photodiode.

22. The device of claim 5 wherein the photodiode is sensitive to X-ray radiation.

* * * * *